United States Patent
Norman, III et al.

(10) Patent No.: US 11,052,864 B2
(45) Date of Patent: Jul. 6, 2021

(54) PRESSURE VESSEL

(71) Applicant: Key Safety Systems, Inc., Sterling Heights, MI (US)

(72) Inventors: Kent Norman, III, St. Petersburg, FL (US); William F. McLeod, Sterling Heights, MI (US); Markell Seitzman, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 174 days.

(21) Appl. No.: 15/957,468

(22) Filed: Apr. 19, 2018

(65) Prior Publication Data

US 2019/0323662 A1    Oct. 24, 2019

(51) Int. Cl.
*B60R 21/26* (2011.01)
*B60R 21/272* (2006.01)
*B60R 21/274* (2011.01)

(52) U.S. Cl.
CPC ............ *B60R 21/26* (2013.01); *B60R 21/272* (2013.01); *B60R 21/274* (2013.01); *B60R 2021/26029* (2013.01); *B60R 2021/26076* (2013.01); *F17C 2201/0109* (2013.01); *F17C 2205/0329* (2013.01); *F17C 2223/035* (2013.01); *F17C 2270/0754* (2013.01)

(58) Field of Classification Search
CPC ........ B60R 21/272; B60R 2021/26076; B60R 21/274; F17C 2201/0109
USPC ....................................................... 280/737
See application file for complete search history.

(56) References Cited

U.S. PATENT DOCUMENTS

| | | | |
|---|---|---|---|
| 3,598,270 A | 8/1971 | Adomaitis et al. | |
| 4,785,950 A | 11/1988 | Miller et al. | |
| 5,634,661 A * | 6/1997 | Dahl | B60R 21/272 280/737 |
| 5,685,558 A * | 11/1997 | Cuevas | B60R 21/203 280/728.2 |
| 5,690,357 A * | 11/1997 | Cuevas | B60R 21/264 280/736 |
| 5,763,817 A * | 6/1998 | Renfroe | B60R 21/272 102/288 |

(Continued)

FOREIGN PATENT DOCUMENTS

| | | | |
|---|---|---|---|
| DE | DT-1906290 | * 10/1969 | |
| EP | 0844148 A1 * | 5/1998 | ........... B60R 21/272 |

OTHER PUBLICATIONS

Machine language translation of DE 1906290 obtained from espacenet.com on May 1, 2020.*

*Primary Examiner* — Ruth Ilan
(74) *Attorney, Agent, or Firm* — Meunier Carlin & Curfman LLC (57) ABSTRACT

A pressure vessel formed by either by: a) mating a first end or closure to a second end or closure or b) mating a first end to an intermediate body member and mating the intermediate body member to a second end; the first end comprising a hollowed thin walled dome (14) having an exterior surface (15a) and an interior surface (15b) and the dome terminating in an edge surface (14a), the dome (14) having an axis Y extending through its geometric center of the exterior surface, the dome supporting at least one thin hollow walled projection (16, 18, 20) having an exterior (19a) and interior surface (19b), the at least one projection extending outwardly from the dome outer surface (15a), and terminating in a top surface (16a, 23).

16 Claims, 12 Drawing Sheets

(56) References Cited

U.S. PATENT DOCUMENTS

| | | | | |
|---|---|---|---|---|
| 5,851,027 | A | * | 12/1998 | DiGiacomo .......... B60R 21/272 280/736 |
| 5,979,936 | A | * | 11/1999 | Moore .................. B60R 21/261 280/736 |
| 6,019,389 | A | * | 2/2000 | Burgi ................... B60R 21/264 280/736 |
| 6,213,503 | B1 | * | 4/2001 | Zimbrich .............. B60R 21/272 280/736 |
| 6,217,064 | B1 | * | 4/2001 | Schwuchow ......... B60R 21/272 280/737 |
| 6,682,708 | B1 | * | 1/2004 | Zeuner ................. B60R 21/272 102/530 |
| 2011/0168726 | A1 | * | 7/2011 | Silva Vieira ......... F17C 13/084 220/590 |
| 2016/0167617 | A1 | * | 6/2016 | Wang ................... B60R 21/272 701/45 |
| 2019/0322239 | A1 | * | 10/2019 | Norman, III ......... B60R 21/264 |

* cited by examiner

PRESSURE VESSEL

BACKGROUND AND SUMMARY OF THE INVENTION

The present invention relates to a pressure vessel, which is a vessel designed for containing substances, reactions, etc. at pressures above atmospheric pressure. The shape of a pressure vessel in general is cylindrical or spherical with a circular cross-section. There are many potential applications of the technology; this includes but is not limited to pressurized dynamic system accumulators (such as air conditioning, braking and suspension systems); pressurized static gas storage tanks (such as transportation or diving tanks); and pressurized devices (such as aerosol spray cans, fire extinguishers, and air bag inflators).

The closed ends of pressure vessels are referred to in the art as heads, ends, sides, or closures (each of which is used interchangeably herein). The closed ends of pressure vessels have shapes that generally fall within the following categories: ellipsoidal, spherical, torispherical, and hemispherical. While each of these shapes has certain benefits for general pressure vessel construction, they do not always readily facilitate the assembly of other components that are internal to or must penetrate through a wall of the closure. Penetrations through such ends, sides, heads or closures generally create weak points, requiring reinforcement such as by adding welded material around the penetrations, or by increasing the overall thickness of the closure relative to the wall of the vessel. Penetrations through the end caps that are off center to the end cap require intermediate mating components having a complex geometry to match the shape of the end cap, and complex assembly processes to properly orient and assemble these components. Further, automatic welding processes are difficult to implement in the context of prior art pressure vessels. These problems are addressed and solved by a novel pressure closure and by a pressure vessel incorporating a novel closure.

Ends or closures of plastic vessels containing pressurized liquids such as carbonated beverages have been provided with protrusions and adjacent valleys extending from the bottom of the vessel to make the bottom more resistant to deformation, particularly deformation or bursting by bulging outward.

U.S. Pat. No. 3,598,270 teaches a blow molded plastic bottle for containing a carbonated beverage at pressures greater than atmospheric pressure. The bottom of the plastic bottle is provided with feet in the form of pads constituting portions of a common annulus around the end of the bottle. The feet are two or more in number but preferably an even number symmetry, facilitating manufacture in separable molds by an extrusion blow molding process. In a preferred form, each leg is defined by sidewalls diverging upwardly and outwardly relative to the polar portion and an outer wall curving upwardly and outwardly to blend into the bottle sidewall. The bottle may be opened in the usual manner at an end of the bottle opposite the bottom of the bottle with a screw-off cap.

U.S. Pat. No. 4,785,950 teaches that the structure taught in U.S. Pat. No. 3,598,720 can be improved by reducing the surface energy on the outside surface of the base of a plastic bottle for carbonated beverages to reduce base failure. U.S. Pat. No. 4,785,950 discloses that the surface energy on the outside surface of the base could be minimized by making the surface rough instead of smooth. This allegedly allows the surface energy to be dispersed over a greater area and also there is more flex because of the irregularity.

The present invention relates to an improved closure, closed end, side, end or head of a pressure vessel as well as the pressure vessel itself. In one embodiment the closure has no openings while in other embodiments the closure has openings to receive control elements to initiate release of gas, or an opening to support a burst disk and/or an opening which functions as a fill port to introduce gas into the pressure vessel. Closures can be connected directly together or connected through an intermediate hollow connector or body to create a pressure vessel. The preferred closure, side, head or end as mentioned is preferably metallic, however other materials capable of containing pressurized gas can be used. Each closure can be formed using a dome or dome-like portion and an optional hollow cylindrical portion extending from a circular edge of the domed portion. As will be seen, the cylindrical portion facilitates connection to the intermediate hollow connector such as a cylindrical body portion to form one version of a pressure vessel. An edge of the domed portion can be secured directly to the body portion without using the cylindrical portion. The domed portion is formed with at least one projection but a plurality of projections with adjacent valleys between the projections is preferred. The alternating projections and valleys are referred to as a petaloid or petaloid shape. To facilitate the introduction of openings into the top of a closure, a flat surface can be provided. Each protrusion has a peripheral, preferably concave shaped surface extending from the center portion to the domed portion.

Many other objects and purposes of the invention will be clear from the following detailed description of the drawings.

BRIEF DESCRIPTION OF THE DRAWINGS

FIGS. 22A, 22B and 22C show another variation of the invention where

DETAILED DESCRIPTION OF THE DRAWINGS

As used herein and in the claims a pressure vessel is a vessel designed for containing substances, gasses, products of chemical reactions, etc., at pressures above atmospheric pressure. As previously mentioned, pressure vessels have various forms with ends, sides, heads or closures and will often have a generally uniform thickness dependent upon the pressure that must be contained.

Figure 1:
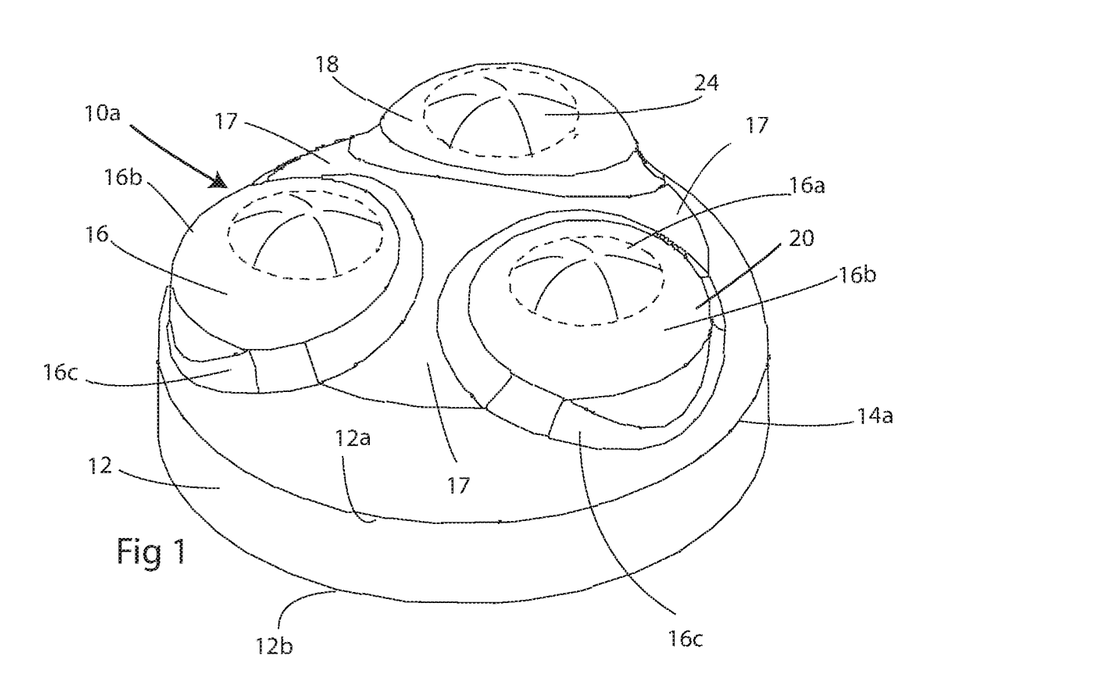
FIG. 1 is a perspective view of the exterior of a closure or end of a pressure vessel according to one embodiment of the invention.
Figure 1A:
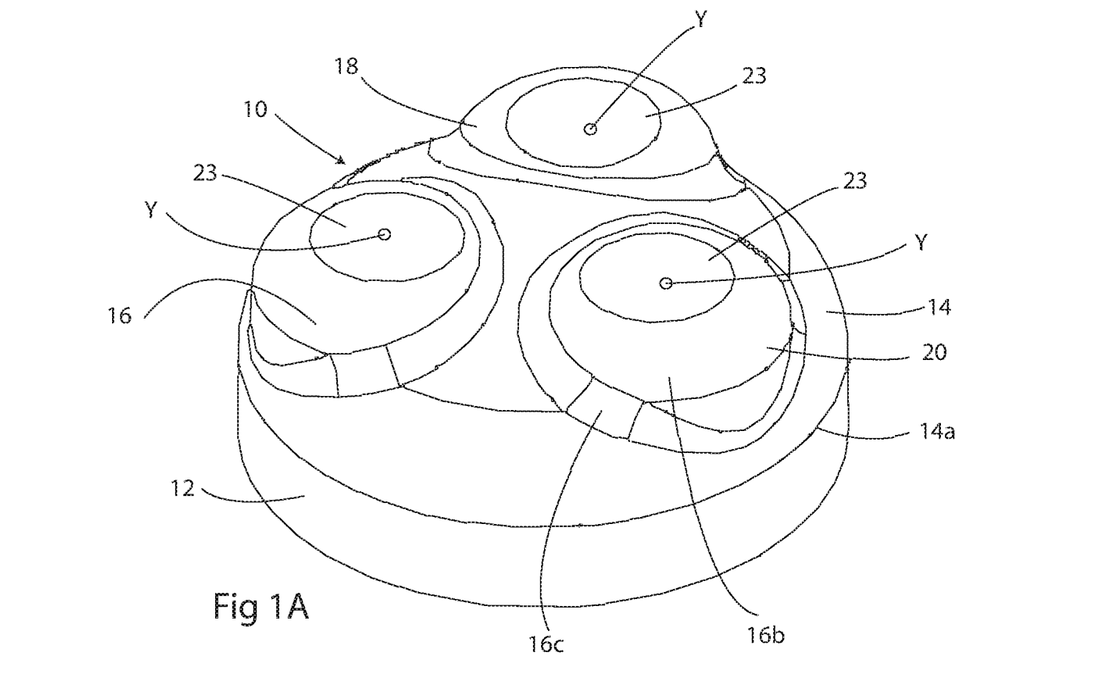
FIG. 1A is a perspective view of one of the preferred embodiments of the present invention.
Figure 2:
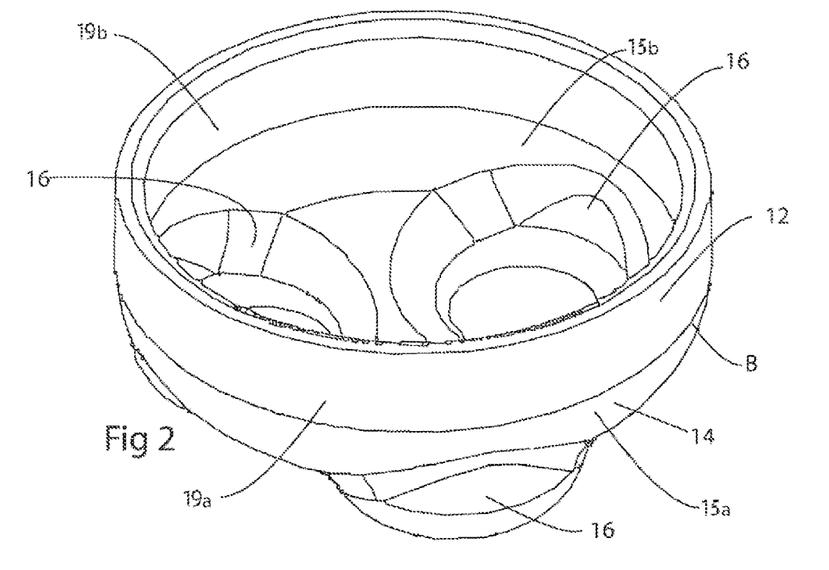
FIG. 2 is a perspective view of the interior of the closure shown in FIG. 1A.

FIG. 1 shows an exemplary end, side, head or closure 10a for a pressure vessel. The closure 10a comprises a dome portion 14 and an optional hollow cylindrical or base portion 12. The dome and base portion shown in FIGS. 1, 1A and 2 are typically hollow thin walled structures. The dome has an outer surface 15a and an inner surface 15b; the base portion 12 has an outer surface 19a and an inner surface 19b. The dome portion can be of many shapes including: ellipsoidal, spherical, torispherical, and hemispherical. Each of the dome and cylindrical portions share a longitudinal axis Y which extends through the geometric center of these portions. The cylindrical or base portion 12 is of a hollow cylindrical shape with parallel sides 12a and 12b. The dome portion can be formed integral with the cylindrical portion 12 or attached to the cylindrical portion such as by welding. The dome portion 14 terminates at a circular edge or surface 14a. Edge 14a is located adjacent edge 12a of the hollow cylindrical portion 12. The second edge or end 12b of the cylindrical portion 12 is open and adapted to be secured to another part of the pressure vessel. As can be appreciated, if the base and dome portions are made as one piece, then edges 14a and 12a are effectively the same. Closure 10a includes at least one projection 16, 18 and/or 20 and intermediate valleys 17; three projections are shown in FIGS. 1 and 1A. Each projection 16, 18 and 20 has a curved top 16a, a central portion 16b and a transition surface 16c which transitions smoothly into the domed portion. The transition surface 16c is generally concave upward in the illustrated embodiments but can be other shapes. As will be seen below each of the projections 16, 18 and 20 is equally spaced about the domed portion or equally spaced relative to the cylindrical portions which provide a stable set of feet for mounting upon a flat surface.

Figure 1B:
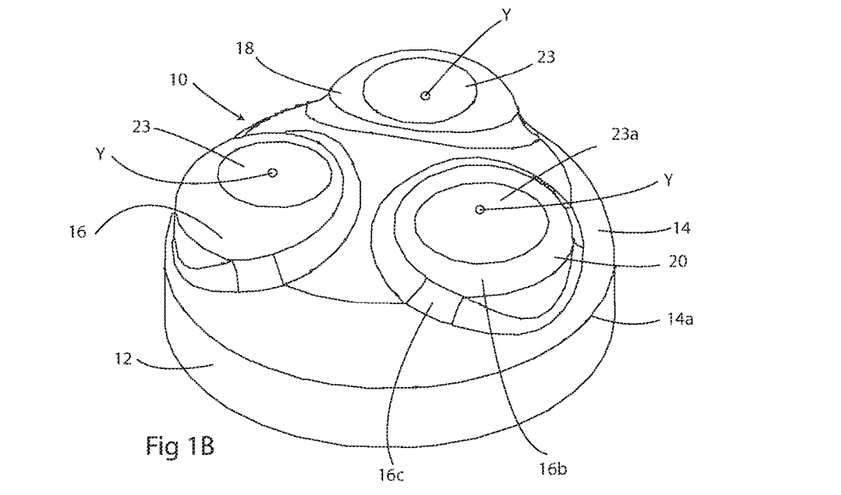
FIG. 1B shows another variant of the invention.
Figure 3:
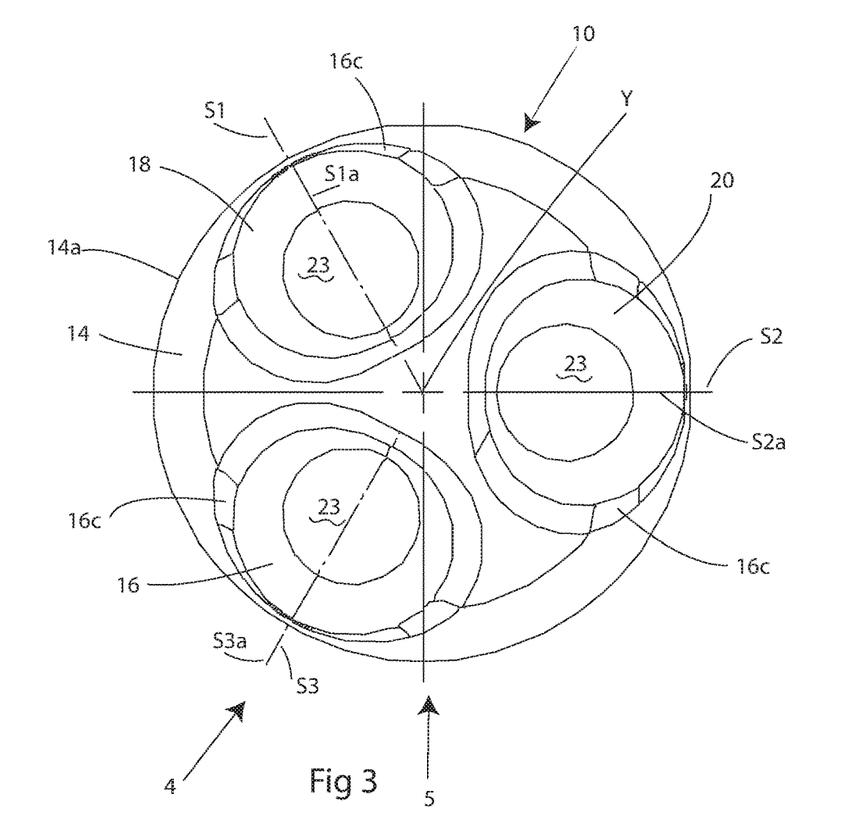
FIG. 3 is a top view of a closure for a pressure vessel.
Figure 4:
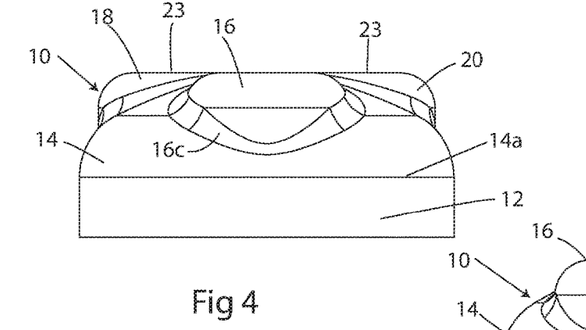
FIG. 4 is a side view of a closure for a pressure vessel looking in the direction indicated by arrow 4 in FIG. 3.
Figure 5:
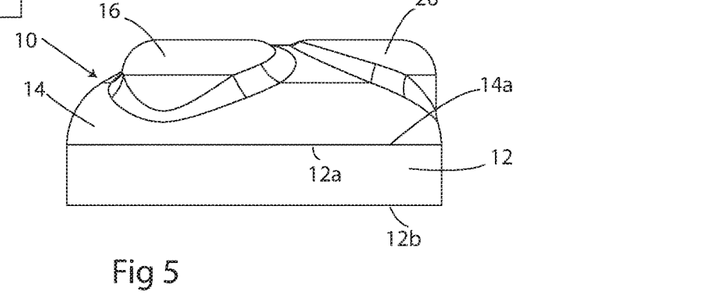
FIG. 5 is a side view of a closure for a pressure vessel looking in the direction indicated by arrow 5 in FIG. 3.
Figure 6:
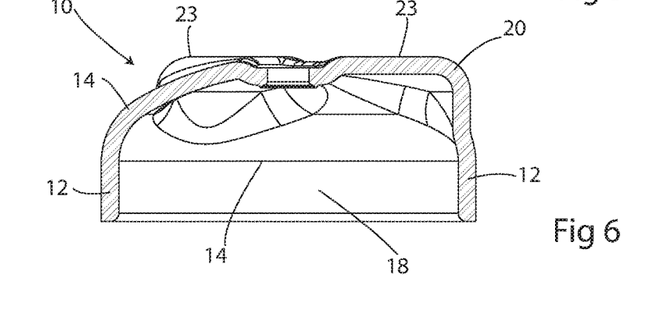
FIG. 6 is a cross-sectional view taken through section line S2-S2 in FIG. 3.

FIGS. 1A-6 show another closure 10 also with three spaced projections 16, 18 and 20 and corresponding intermediate valleys 17. FIG. 3 shows the edges S 1, S2 and S3 of three planes S 1A, S2A and S3A are equidistantly positioned about the dome and cylindrical portions. Each edge S1, S2 and S3 also forms intersection axes extending from an axis Yl at the geometric center of each of the dome and cylindrical portions. Each plane S 1A, S2A and S3A respectively bisects one of the three protrusions 16, 18 and 20. The major difference between closure 10a and 10 is the curved top surface 16a has been truncated forming a flat surface 23. The flat surface 23 facilitates machining features, such as openings and threads into this top truncated surface. Each flat surface as illustrated resides in the same plane but each flat surface can be higher or lower as required. As can be seen in FIGS. 1A-6 each protrusion 16, 18 or 20 of closure 10 does not have any through holes. The closure 10 primarily functions solely to seal an end or side of a pressure vessel. Closure 10a and closure 10 may be manufactured using well known methods, for example, used in the metal working arts including stamping, punching, and drilling procedures. Reference is briefly made to FIG. 1B which also shows three projections 16, 18 and 20; however the flat surface 23a associated with projection 20 is in a plane lower than that of the flat surfaces 23 associated with projections 16 and 18.

Figure 7:
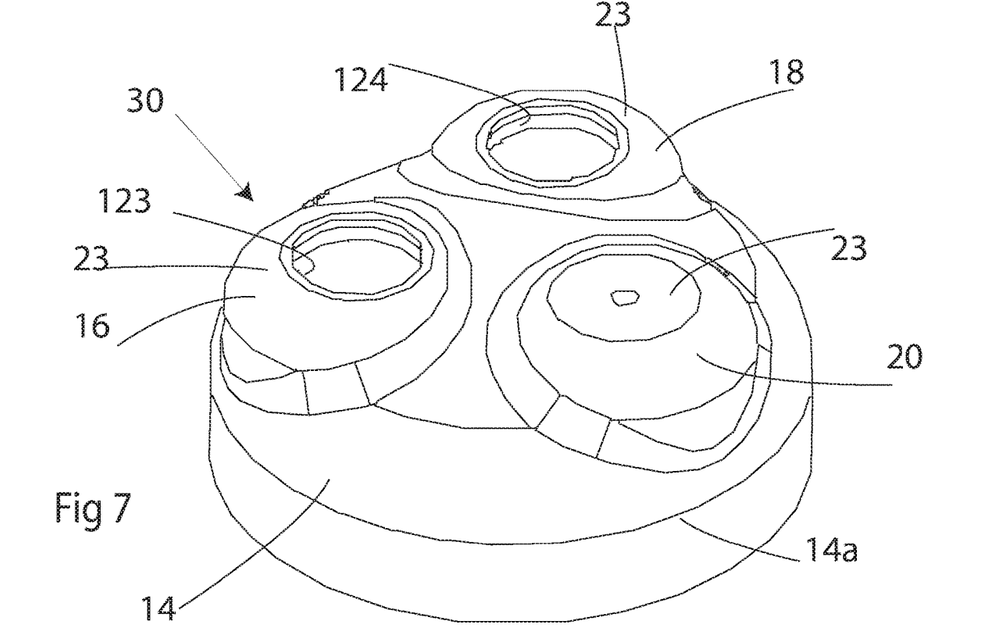
FIG. 7 is a perspective view of the exterior of another embodiment of a closure for a pressure vessel.
Figure 8:
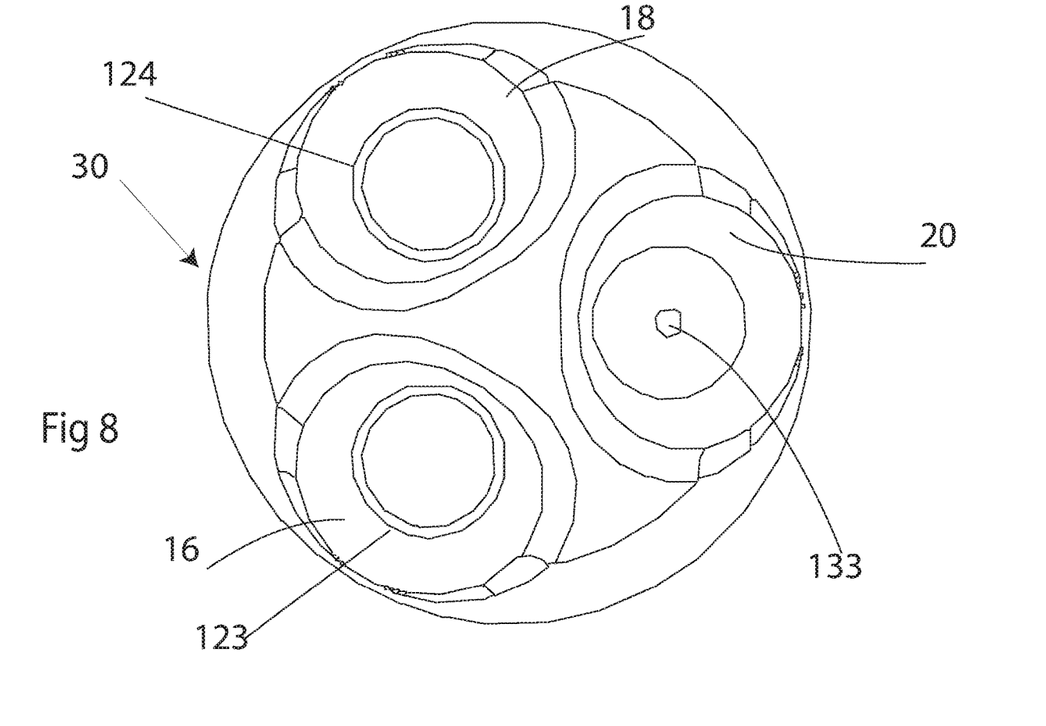
FIG. 8 is a top view of the closure shown in FIG. 7.

Closure 30 as shown in FIGS. 7 and 8 is substantially identical to closure 10. The major difference is that at least one of the projections 16, 18 or 20 includes a threaded opening 123 and a smooth walled opening 124 formed in a flat surface 23. Also at least one of the projections includes a small through hole 133 formed in one of the flat surfaces 23. As before each flat surface or flat portion 23 is arranged coplanar to each other but this is not necessary as previously shown. Through hole 133 functions as a fill hole or port to introduce pressurized gas into the pressure vessel which is closed by a ball or similar form which is welded thereon. A control element is fitted to one or both of the holes 123 and 124. The reason the threaded hole 123 and smooth hole 124 are shown side by side is to illustrate the flexibility of the present invention. For example, if the closure is part of a high pressure device (such as an airbag inflator) a control element such as an ignitor is welded to a smooth hole to achieve a gas tight configuration and to make the control element an integral part of the end cap or closure for improved structural integrity. For lower pressure applications, the control element such as a manually operated valve 125 and nozzle 304 can be used and screwed into the threaded hole.

Figure 13:
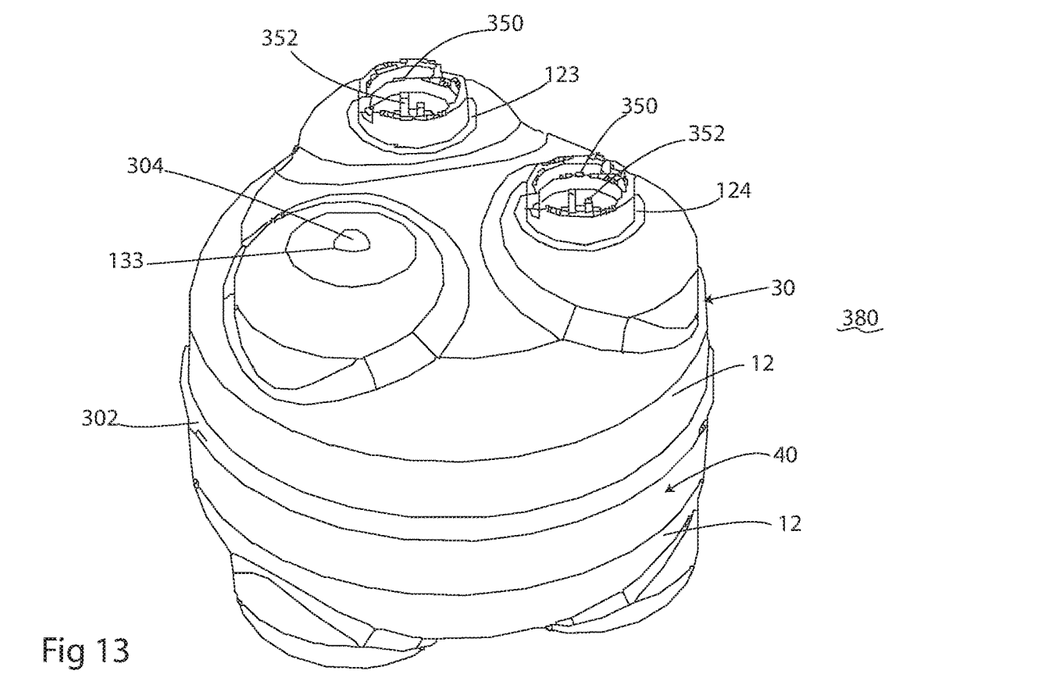
FIG. 13 is a top perspective view of a pressure vessel which is a major part of an air bag inflator.

For example, if closure 30 is part of an air bag inflator an ignitor 350 is inserted into one or both of openings 123 or 124 whether threaded or not. This is shown in FIGS. 13 and 22b. Closure 30 can, for example, be used as the control end of a fire extinguisher having a single threaded opening 123 with opening 124 closed. In this example a hand actuated open/closed valve 125 (shown schematically in FIG. 7) can be secured to opening 123. Another benefit of locating the flat top surfaces 23 in a coplanar fashion is the holes can be easily created using standard Z-axis machining.

Figure 9:
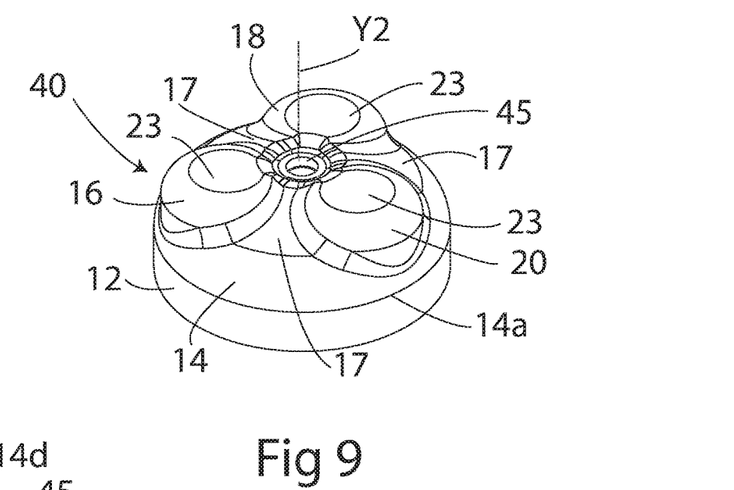
FIG. 9 is a perspective view of another closure for a pressure vessel according to the present invention.
Figure 10:
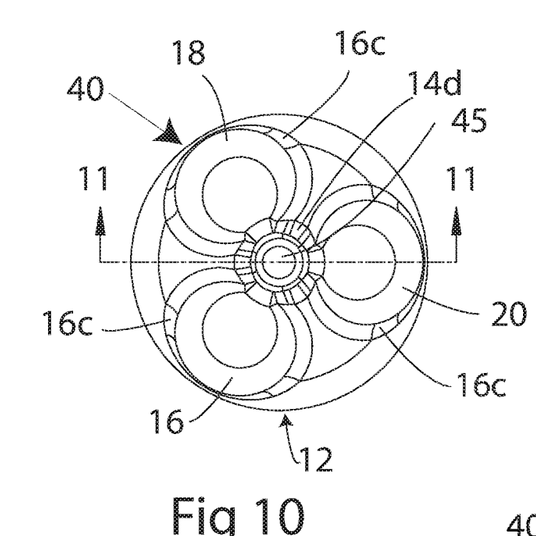
FIG. 10 is a top view of the closure shown in FIG. 9.
Figure 11:
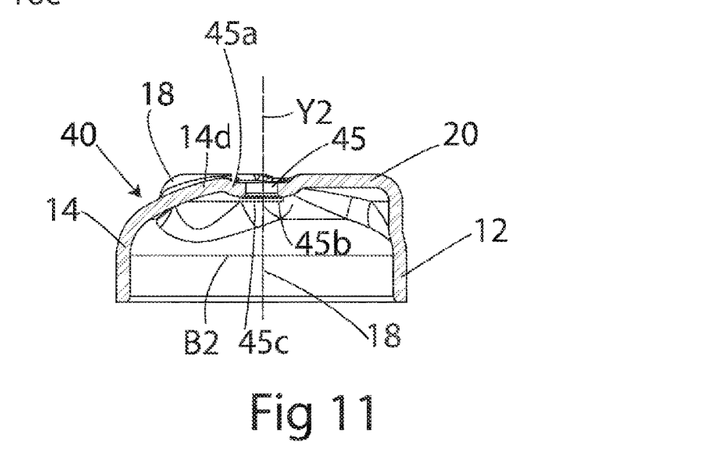
FIG. 11 is a cross-sectional view of the closure taken at section line 11-11 of FIG. 10.

FIGS. 9-11 show another type of closure 40 useful in a pressure vessel which is part of an air bag inflator. This type of closure 40 additionally provides an exit orifice closed by a rupturable burst disk 47 which is broken to release the pressurized gas stored in the pressure vessel.

Closure 40 requires a structure to support a burst disk. This structure can be as simple as a flange surrounding a circular through hole 45. The circular peripheral edge of the disk is typically welded to the flange. The through hole 45 can be placed at any convenient location in closure 40 such as in one of the flat surfaces 23 or alternatively the hole can be associated with a closure such as 10 which supports the ignitor. However, in the embodiment illustrated in FIGS. 9-11 the through hole (or exit hole or exit port) 45 is formed in a recessed portion 14d of the center of the dome 14 generally at the intersection of the valleys 17. The area 45a around hole 45 is upset back toward the inside of the dome. The purpose of this is to create a symmetrical interface on the inside of the dome, and to reinforce the opening 45 by:

a) cold working the material around the hole, and by b) stretching the material back towards the pressurized side of the wall. Item 45b is a resistance weld projection ring that is formed in the dome during the offset restrike. By forming this on the inside of the dome, it allows one to weld the disk 45c directly to the pressure vessel without any intermediate formed or machined part (commonly referred to in the art as a disk carrier).

Figure 12:
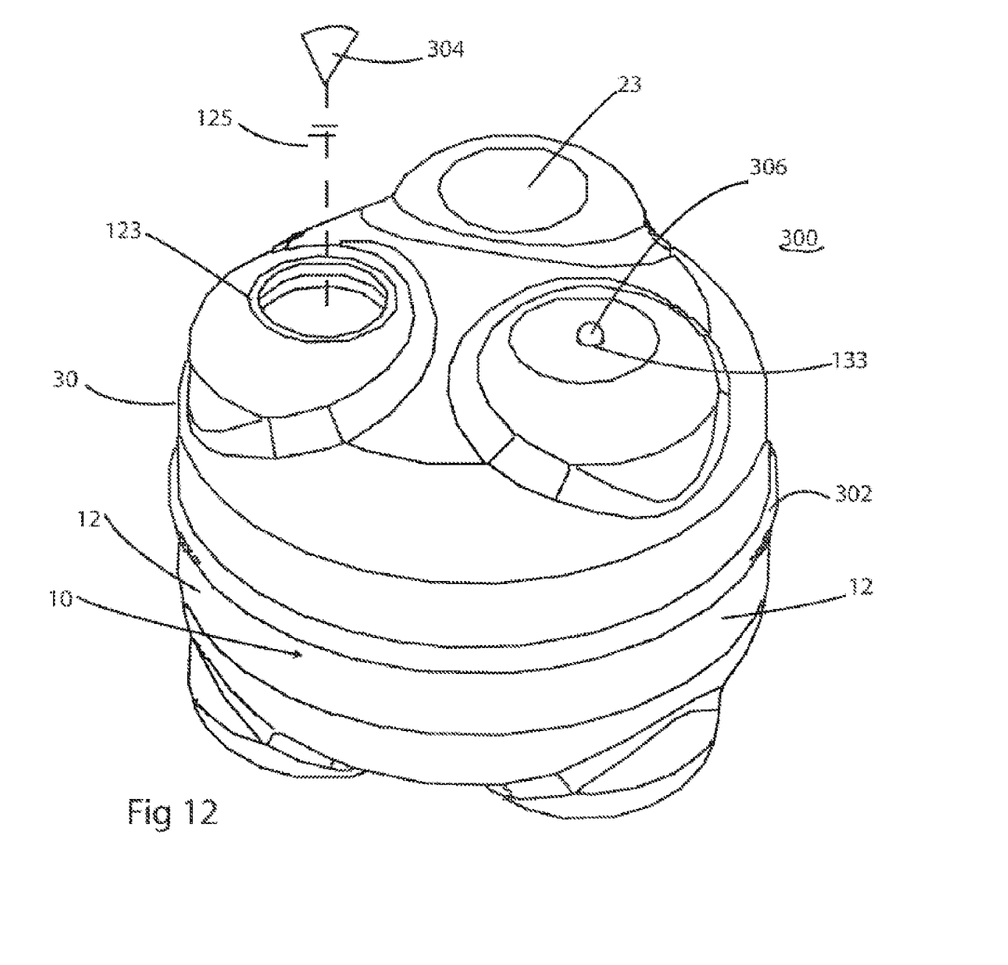
FIG. 12 is a top perspective view of a pressure vessel formed of two closures and includes a hand operated control element.

FIG. 12 shows a pressurized storage vessel 300 formed of closure 10 which does not include a burst disk and exit hole 45 and closure 30. The respective cylindrical portions 12 of each of the closures are butt welded as shown by 302. In this embodiment the previously described threaded opening 123 is removed and is represented by a top section of the closure. Secured in a pressure tight manner into the threaded opening 123 is a manually activated valve 125 which when activated permits pressurized gas to flow through a nozzle 304. The opening 133 of closure 30 has first been used in a known way to introduce pressurized gas into the pressure vessel 300 and thereafter opening 133 is closed in a pressure type manner by a ball 306. The opening 133 of closure 30 has first been used in a known way to introduce pressurized gas into the pressure vessel 300 and thereafter opening 133 is closed in a pressure type manner by a ball 306.

Figure 14:
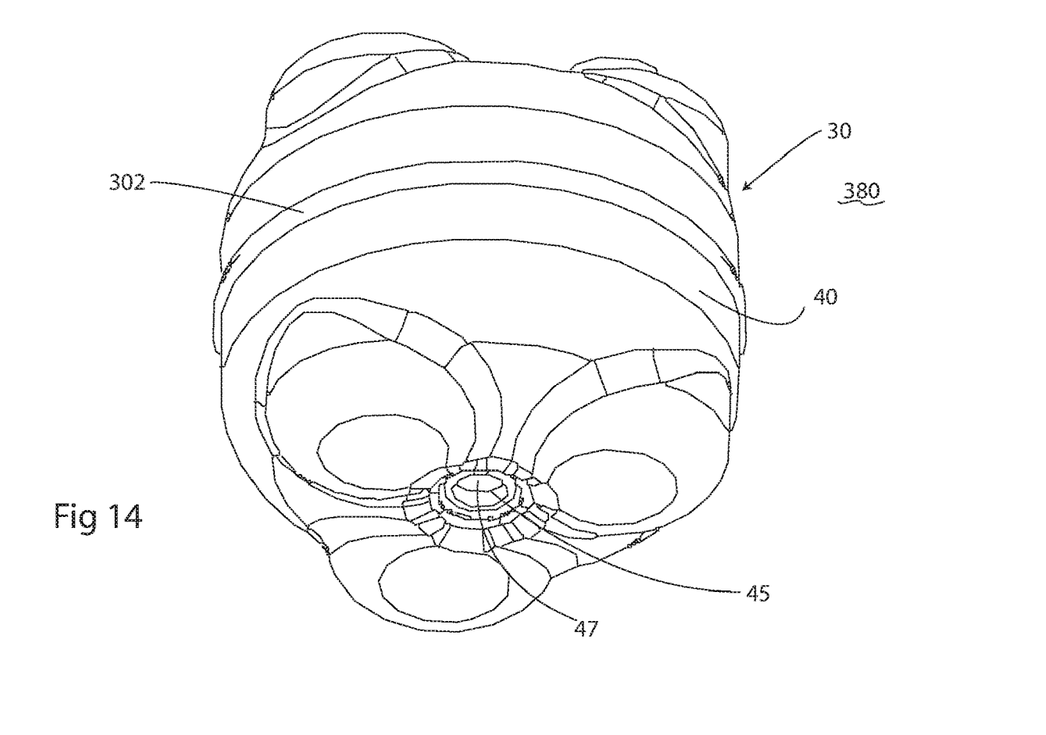
FIG. 14 is a bottom perspective view of the pressure vessel in FIG. 13.
Figure 15:
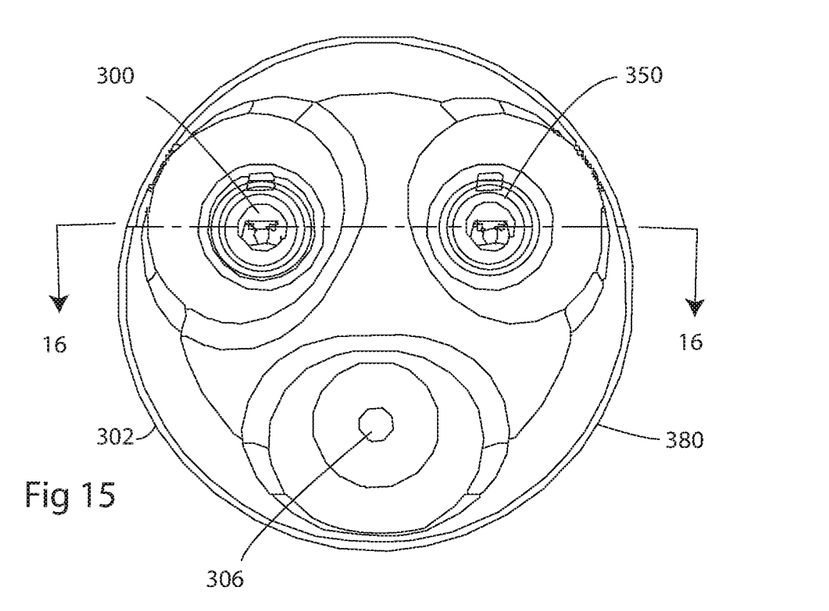
FIG. 15 is a top view of the pressure vessel in FIG. 13.
Figure 16:
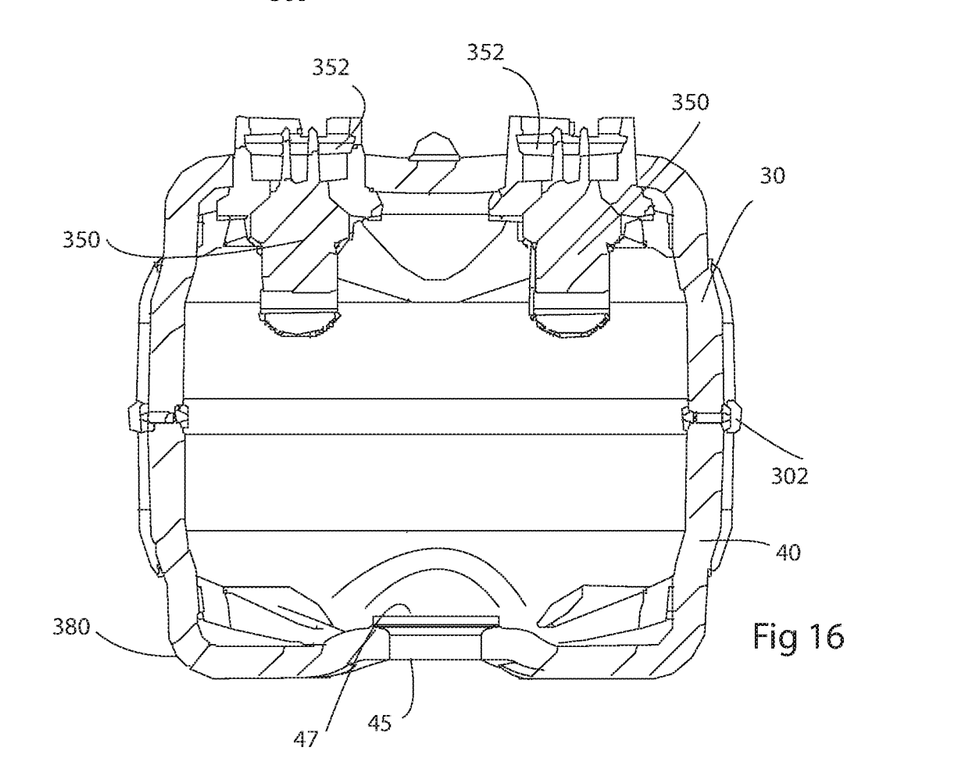
FIG. 16 is a cross-sectional view taken through section line 16-16 of FIG. 15.

Reference is made to FIGS. 13 through 19 which show a new form of the pressure vessel as well as an air bag inflator. FIGS. 13 and 14 show two related views of a pressure vessel 380. This pressure vessel is formed utilizing closure 40 and closure 30 which are welded together as previously mentioned at a butt weld 302. Closure 30 utilizes two igniters 350 which are known in the art of air bag inflators. Each ignitor has a set of electrical contacts 352. As is known in the art each ignitor 350 includes a variety of pyrotechnic chemicals which upon ignition create products of combustion including heat and gas which are in direct communication with other internal hardware for the containment, segregation, and filtration of other pyrotechnic materials which when activated increase the pressure of the fluid within the pressure vessel 382 to a level sufficient to burst disk 47, subsequently inflating the airbag. The cross-sectional view of FIG. 16 shows the placement of the ignitors 350 within closure 30. Additionally, the placement of the burst disk 47 relative to opening 45 is also shown in FIG. 16 as is the integrally formed weld ring.

Figure 17:
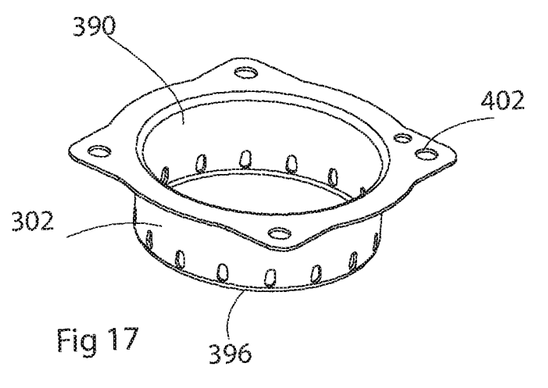
FIG. 17 is a perspective view of an inflator housing/diffuser which is a major part of an air bag inflator.
Figure 18:
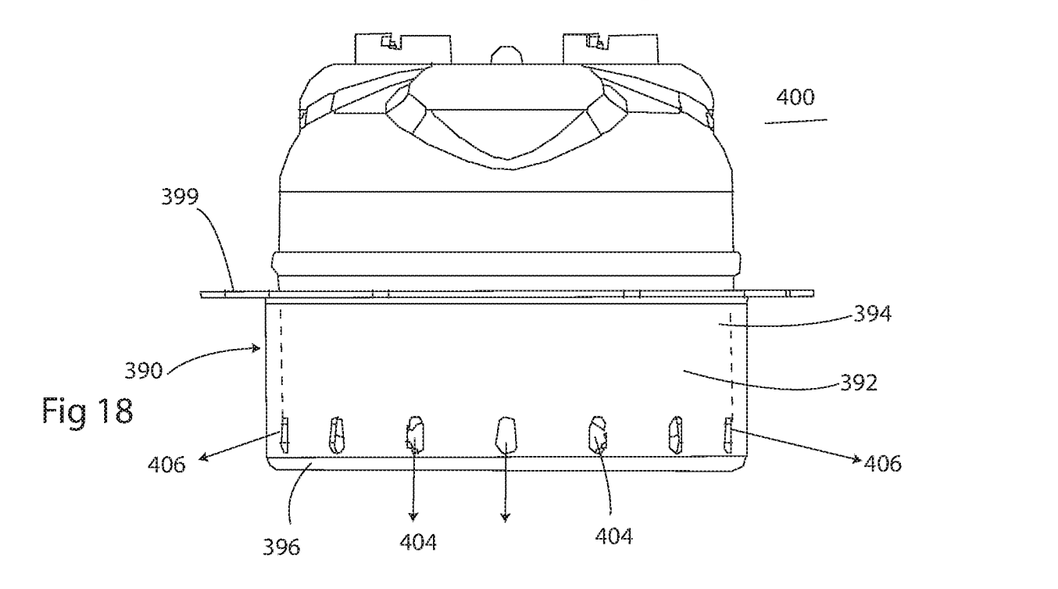
FIG. 18 shows an air bag inflator with the pressure vessel of the FIG. 14 placed in the housing of FIG. 17.
Figure 19:
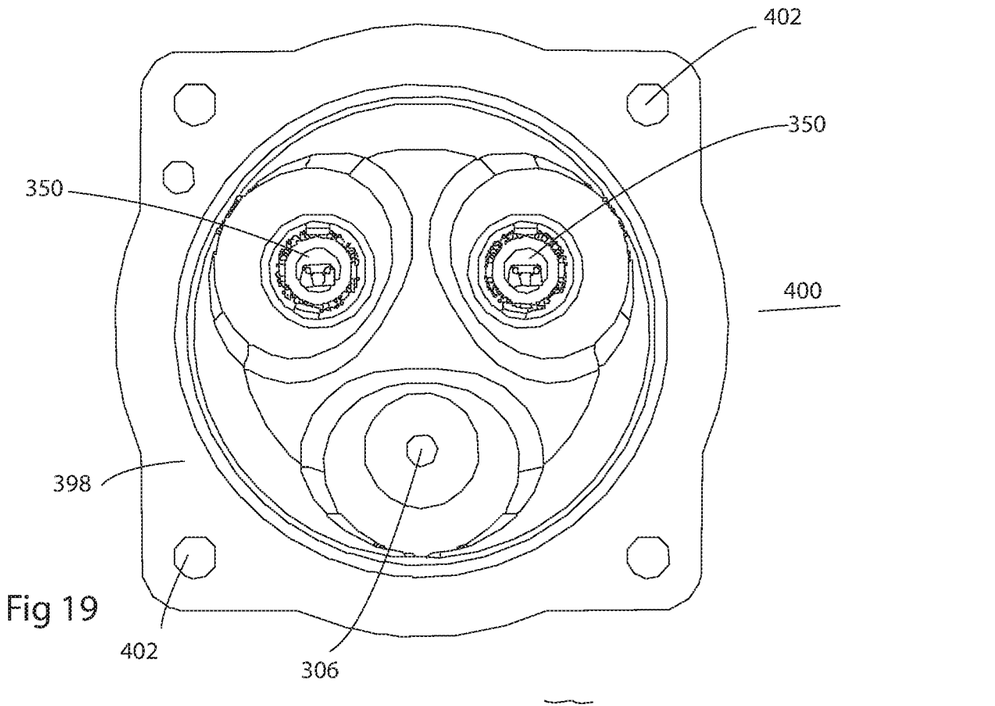
FIG. 19 is a top view of an air bag inflator.

FIG. 17 shows a housing/diffuser 390 which is part of inflator 400. Housing/diffuser 390 comprises an open cylindrical basket 392 having a circular wall 394. The bottom of the wall is closed by an integral plate 396. Secured to the top of the basket or to the top of the wall 394 is a mounting flange 398 having a plurality of mounting holes 402. The lower part of the basket 392 has a number of openings 404 symmetrically located at the lower part of wall 394. Basket 390 of FIG. 17 is slid upon closure 40 of FIG. 16 yielding the orientation shown in FIG. 18. The basket can be securely attached to the pressure vessel by welding or by a press fit. In operation a signal indicative of a particular crash is communicated to one or both terminals of each ignitor 350. Upon activation of an ignitor, the pressure within the pressure vessel increases to a level sufficient to cause the rupturable disc 47 to burst; thereafter the stored gas exits the series of openings 404. Arrows 406 diagrammatically show the flow path of the stored gas out of the diffuser 390 into an adjacent air bag (not shown).

Figure 20:
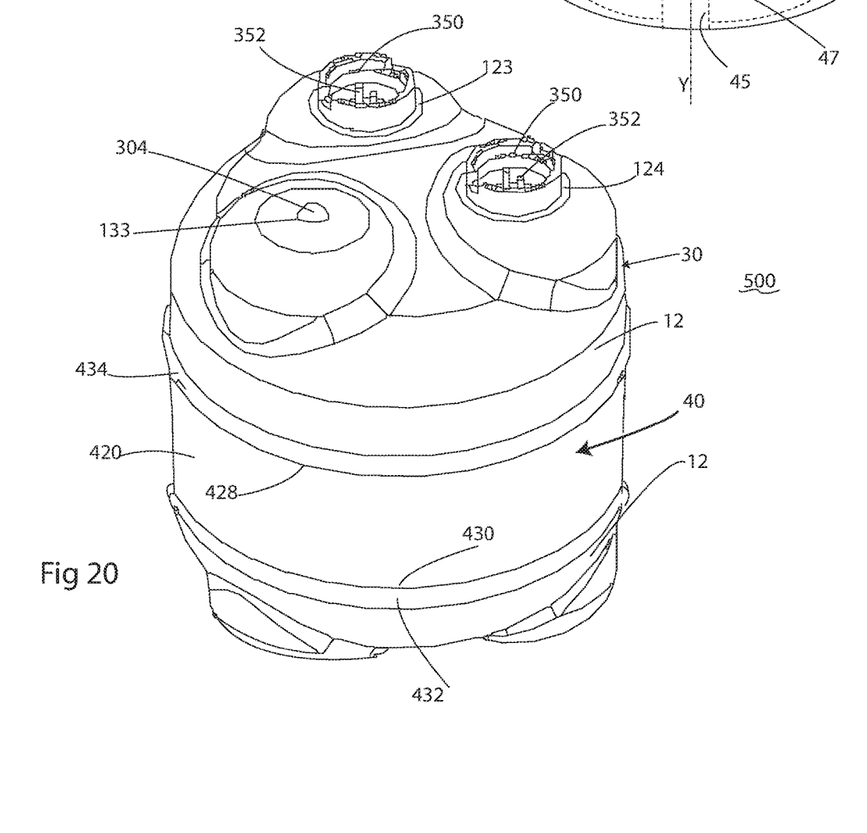
FIG. 20 shows an inflator of the larger size.

Reference is briefly made to FIG. 20 which shows another air bag inflator 500. Air bag inflator 500 utilizes closure 30 and closure 40 as previously illustrated in FIG. 12 as well as in FIG. 13. In FIG. 13 closures 30 and 40 are butt welded together. In FIG. 20 an intermediary hollow cylindrical body 420 is inserted between closures 10 and 42 increasing the internal volume of inflator 500 relative to inflator 400. The cylindrical portions 12 of each of the closures 10 and 40 are butted up against the respective ends 428 and 430 of the cylindrical body 420 and butt welded. The weld between the cylindrical portion 12 of closure 40 and the cylindrical body 420 is shown as 432. The butt weld between the cylindrical portion 12 of closure 10 and the cylindrical body 420 is shown by 434. As shown in FIG. 20 the diameter of the cylindrical body 420 is substantially the same as the diameter of the cylindrical portions 12 of each of the closures 10 and 20 thereby enabling the butt welds. Alternatively, the diameter of the cylindrical member can be slightly smaller enabling the cylindrical body 420 to be press fit into the inside wall of the cylindrical member 12 of both closures 10 and 40 and thereafter the weld can be accomplished along the bottom of each cylindrical portion, thereby securing the cylindrical body 422 to each respective cylindrical portion 12; this feature is shown in FIG. 21.

Figure 21:
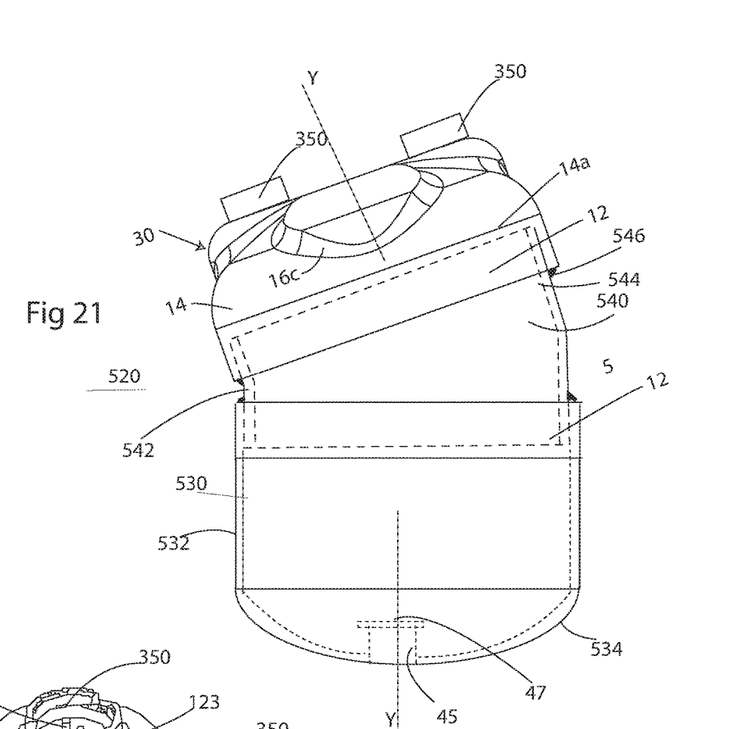
FIG. 21 shows a top view of another embodiment of the invention.

FIG. 21 illustrates the flexibility that can be achieved utilizing the present invention. In each of the above illustrated inflators the end closures are assembled such that the central axis extending through each closure is collinear, this is not the case with inflator 520. Inflator 520 utilizes closure 30 utilizing one or more igniters 350 as illustrated in FIG. 20. Inflator 520 further includes a generic hollow closure 530 with walls 532 and an end 534. End 534 supports an exit opening 45 with a burst disk 47. Each closure 30 and 530 includes a central axis Y generally perpendicular to the respective closure. As can be seen in FIG. 21 each respective axis Y is angularly offset relative the other by an angle A. To achieve this orientation an intermediate hollow body member 540 with cylindrical wall 542 is inserted between closures 30 and 530. The respective ends 544 of end wall 542 can be cut to the proper angle to achieve the overall angular displacement of angle A. As can be appreciated in the configuration shown, only the lower end of the wall 542 is cut to an angle. Essentially body member 540 has a bent or angled configuration. The respective end 544 of wall 542 is inserted into the base portion 12 of closure 30 and inserted into the base portion 12 of closure 530. The wall 542 and base portions 12 are welded together. The welds are shown as 546. As can be appreciated the body member 540 can also be butt welded to the base portions 12.

Figure 22A:
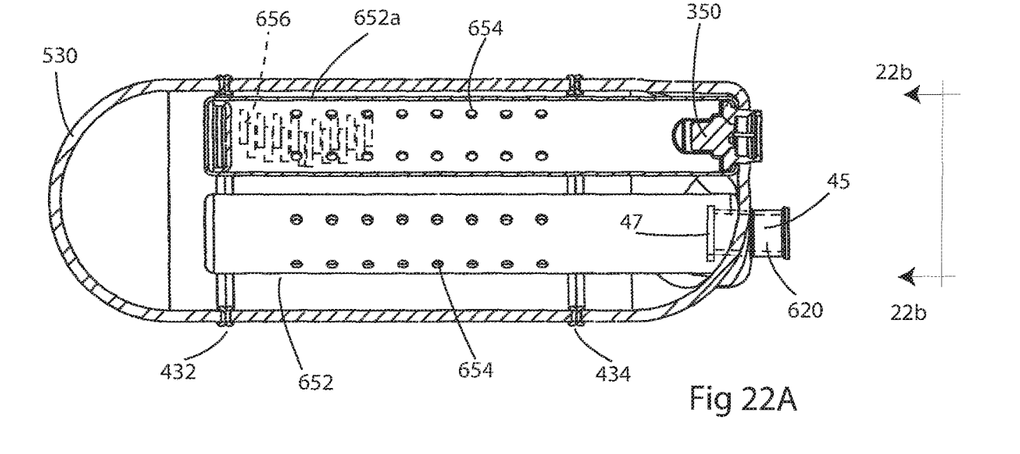
FIG. 22A is a cross-sectional view through section line 22a-22a of FIG. 22a and FIG. 22C is a perspective view of the inflator.
Figure 22B:
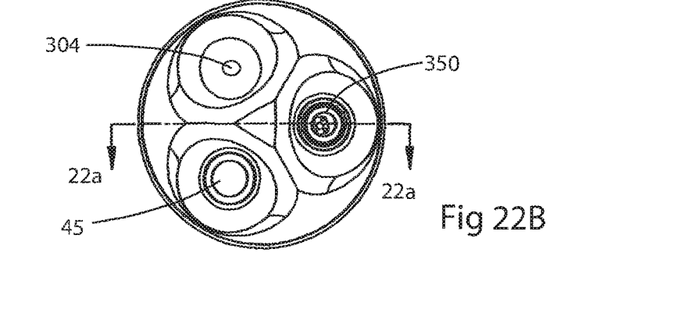
FIG. 22B is an end view of an inflator.
Figure 22C:
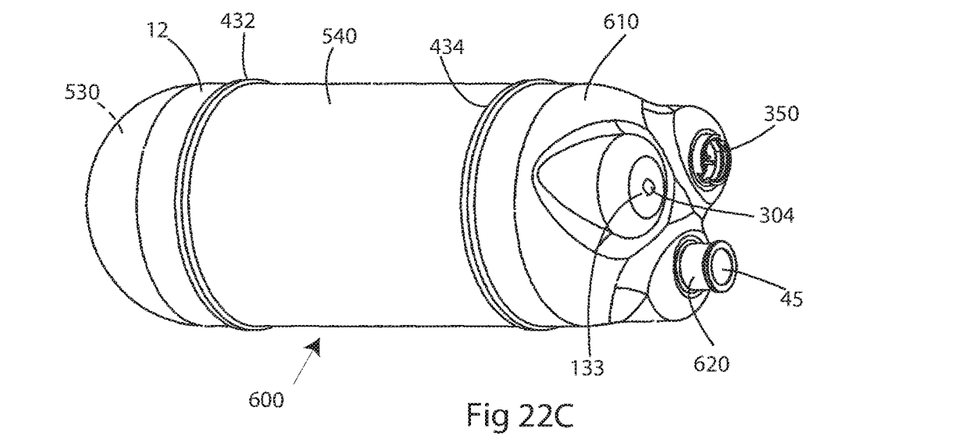

FIGS. 22A-C show further features of the present invention and illustrate inflator 600. Inflator 600 includes an intermediate section 540 welded to a semi-cylindrical section 530 much the same as shown above but without the exit port 45 and burst disk. Sections 540 and 530 are welded together at weld 432 as also shown above. Inflator 600 further includes closure 610. Closure 610 differs from the prior illustrated closures in that each elemental projection 16, 18 and 20 of closure 610 satisfies a different function. As can be seen one projection supports an ignitor 350 while another projection supports an exit pipe 620 which defines the exit orifice or opening 45. Yet another projection is used as a fill port 133 closed by an appropriate member such as ball 304. Closure 610 and intermediate member 540 are welded together at 434. As can be appreciated FIG. 22A is a cross-sectional view of inflator 600 while FIG. 22B is an end view and FIG. 22C is a projected view. Inflator 600 is illustrative of a hybrid inflator having stored gas within the interior volume of the inflator. Ignitor 350 is positioned within an internal tube 652 having a plurality of orifices 654. Positioned within tube 652 is a quantity of propellant shown as a plurality of discs 656. Upon activation of the ignitor 350 the propellant discs 656 are caused to burn thereby elevating the temperature and pressure of the gas within inflator 600. The openings 654 on tube 652 act as a filter. The heated gas exits the inflator by flowing through openings 654, another filter, on an additional tube 652*a*. At a preset pressure, disc 47 is broken and the gas exits the inflator through the tube 620 and output port or orifice 45.

Many changes and modifications in the above-described embodiment of the invention can, of course, be carried out without departing from the scope thereof. Accordingly, that scope is intended to be limited only by the scope of the appended claims.

The invention claimed is:

1. A pressure vessel comprising a first end portion and a second end portion, the first end portion comprising:
    a dome having an exterior surface and an interior surface, the dome including a first projection having an exterior and interior surface, the first projection extending outwardly from the dome exterior surface and comprising an end surface,
    wherein the end surface of the first projection defines an opening, wherein a control element is coupled to the opening to achieve a gas tight configuration, wherein the control element is an ignitor;
    wherein the dome further comprises a second projection and a third projection, each comprising an end surface; and
    wherein the end surface of the second projection defines an opening and a ball is welded to the opening of the second projection to seal the opening.

2. The pressure vessel according to claim 1 wherein the opening defined by the end surface of the first projection is one of: a) a threaded opening, or b) a smooth opening.

3. The pressure vessel according to claim 1 wherein each end surface is arranged coplanar to each of the others.

4. The pressure vessel according to claim 1 wherein the first end portion is part of an air bag inflator.

5. The pressure vessel according to claim 4 wherein the second end portion is part of the air bag inflator, wherein the second end portion defines an exit opening closed by a burst disk, wherein the burst disk is breakable to release a pressurized gas stored in the pressure vessel.

6. The pressure vessel according to claim 5 wherein the second end portion includes a structure to support the burst disk, the structure defining the exit opening, wherein the structure includes a flange surrounding the exit opening, the burst disk having a peripheral edge welded to the flange.

7. The pressure vessel according to claim 6 wherein the exit opening is formed in a recessed portion of a center of the second end portion.

8. The pressure vessel according to claim 4 further comprising a diffuser.

9. The pressure vessel according to claim 8 wherein the diffuser comprises an open cylindrical basket comprising a circular wall, wherein a first end of the circular wall is closed by an integral plate, wherein a second end of the circular wall comprises a mounting flange having a plurality of mounting holes.

10. The pressure vessel according to claim 9 wherein the diffuser is securely attached to the second end portion by welding or by a press fit.

11. The pressure vessel according to claim 4 further comprising an intermediary hollow cylindrical body disposed between the first end portion and the second end portion, the first end portion and second end portion each being welded to a respective end of the intermediary hollow cylindrical body.

12. The pressure vessel according to claim 11 wherein each of the first end portion and the second end portion includes a central axis and the central axes are angularly offset relative to each other by a displacement angle, wherein the intermediate hollow cylindrical body is disposed between the first end portion and the second end portion, wherein each respective end of the intermediate hollow cylindrical body is angled relative to the other to achieve the displacement angle.

13. The pressure vessel according to claim 1 wherein the end surface of the third projection defines an opening, wherein an igniter is coupled to each of the openings defined by the end surface of the first projection and the end surface of the third projection, each ignitor having a set of electrical contacts and each ignitor including a variety of pyrotechnic chemicals which produce heat and gas upon ignition.

14. The pressure vessel according to claim 13, wherein each igniter is welded to each of the openings defined by the end surface of the first projection and the end surface of the third projection.

15. The pressure vessel according to claim 1 wherein the first end portion and the second end portion are coupled by a butt weld.

16. The pressure vessel according to claim 1, wherein the control element is welded to the opening defined by the end surface of the first projection.

* * * * *